United States Patent
Novak (10) Patent No.: US 8,001,144 B2
(45) Date of Patent: Aug. 16, 2011

(54) DETECTING RELATIONSHIPS IN UNSTRUCTURED TEXT

(75) Inventor: Jasmine Novak, Mountain View, CA (US)

(73) Assignee: International Business Machines Corporation, Armonk, NY (US)

(*) Notice: Subject to any disclaimer, the term of this patent is extended or adjusted under 35 U.S.C. 154(b) by 447 days.

(21) Appl. No.: 12/056,048

(22) Filed: Mar. 26, 2008

(65) Prior Publication Data

US 2008/0177740 A1 Jul. 24, 2008

Related U.S. Application Data

(63) Continuation of application No. 11/231,205, filed on Sep. 20, 2005, now abandoned.

(51) Int. Cl.
G06F 17/30 (2006.01)
G06F 17/27 (2006.01)

(52) U.S. Cl. .......................... 707/776; 704/9

(58) Field of Classification Search .............. 707/706, 707/776
See application file for complete search history.

(56) References Cited

U.S. PATENT DOCUMENTS

| | | | |
|---|---|---|---|
| 5,696,916 A * | 12/1997 | Yamazaki et al. | 715/853 |
| 5,819,260 A | 10/1998 | Lu et al. | |
| 5,819,265 A * | 10/1998 | Ravin et al. | 1/1 |
| 5,848,407 A * | 12/1998 | Ishikawa et al. | 1/1 |
| 6,263,335 B1 | 7/2001 | Paik et al. | |
| 6,442,545 B1 | 8/2002 | Feldman et al. | |
| 6,505,197 B1 | 1/2003 | Sundaresan et al. | |
| 6,539,376 B1 | 3/2003 | Sundaresan et al. | |
| 6,629,097 B1 | 9/2003 | Keith | |
| 6,741,988 B1 * | 5/2004 | Wakefield et al. | 707/741 |
| 6,829,668 B2 | 12/2004 | Keskar et al. | |
| 6,968,332 B1 | 11/2005 | Milic-Frayling et al. | |
| 7,146,308 B2 * | 12/2006 | Lin et al. | 704/9 |
| 7,363,308 B2 * | 4/2008 | Dillon et al. | 707/706 |
| 7,587,381 B1 * | 9/2009 | Remy et al. | 1/1 |
| 2003/0120640 A1 | 6/2003 | Ohta et al. | |

(Continued)

OTHER PUBLICATIONS

Oren Etzioni, Michael Cafarella, Doug Downey, Ana-Maria Popescu, Tal Shaked, Stephen Soderland, Daniel S. Weld, Alexander Yates, Unsupervised named-entity extraction from the web: an experimental study. Artificial Intelligence, v.165 n.1, p. 91-134, available online Apr. 14, 2005.*

(Continued)

*Primary Examiner* — Robert Timblin
(74) *Attorney, Agent, or Firm* — Gibb I.P. Law Firm, LLC; Daniel E. Johnson (57) ABSTRACT

Disclosed are embodiments of a system and a method for detecting relationships described in unstructured text-based electronic documents. The system and method incorporate the use of an input file that contains one or more text patterns that represent particular relationships. The text patterns each include regular text expressions that describe the particular relationship and slots for the location of each entity in that relationship. Document(s) are selected by a user and scanned by a proper noun tagger that identifies and tags every occurrence of proper names within the document(s). Then, a pattern matcher scans the document(s) to match text patterns. If a text pattern is matched within a document a relationship detector extracts all pairs of proper names found in the slots for each matched text pattern. The output from the relationship detector includes the names for each entity in the relationship, the type of relationship, and the identity of the document and the location of the sentence describing the relationship in the document.

21 Claims, 4 Drawing Sheets

U.S. PATENT DOCUMENTS

| | | | |
|---|---|---|---|
| 2003/0125929 | A1 | 7/2003 | Bergstraesser et al. |
| 2003/0191625 | A1 | 10/2003 | Gorin et al. |
| 2004/0073548 | A1 | 4/2004 | Lim et al. |
| 2004/0073874 | A1 | 4/2004 | Poibeau et al. |
| 2004/0093331 | A1 | 5/2004 | Garner et al. |
| 2004/0167911 | A1 | 8/2004 | Wakefield et al. |
| 2004/0225555 | A1 | 11/2004 | Persidis et al. |
| 2004/0243645 | A1 | 12/2004 | Broder et al. |
| 2005/0038770 | A1 | 2/2005 | Kuchinsky et al. |
| 2005/0060170 | A1 | 3/2005 | Kummamura et al. |
| 2005/0071217 | A1 | 3/2005 | Hoogs et al. |
| 2005/0108630 | A1 | 5/2005 | Wasson et al. |
| 2005/0125216 | A1 | 6/2005 | Chitrapura et al. |
| 2005/0216443 | A1* | 9/2005 | Morton et al. .................... 707/3 |
| 2006/0277465 | A1 | 12/2006 | Pandit et al. |

OTHER PUBLICATIONS

O. Etzioni, M. Cafarella, D. Downey, S. Kok, A. Popescu, T. Shaked, S. Soderland, D. Weld, A. Yates, Web-scale information extraction in KnowItAll, in: Proceedings of the 13th International World Wide Web Conference (WWW-04), New York, 2004, pp. 100-110.*

Uchimoto et al., "Named Entity Extraction Based on a Maximum Entropy Model and Transformation" Proceedings of the 38th Annual Meeting on Association for Computational Linguistics. pp. 326-335, 2000.

Mooney et al., "Mining Knowledge from Text Using Information Extraction" ACM Explorations Newsletter, vol. 7, Issue 1, pp. 3-10, 2005.

* cited by examiner

DETECTING RELATIONSHIPS IN UNSTRUCTURED TEXT

CROSS-REFERENCE TO RELATED APPLICATIONS

This application is a Continuation of U.S. Application Ser. NO. 11/231,205 filed Sep. 20, 2005, the complete disclosure of which, in its entirety, is herein incorporated by reference.

BACKGROUND OF THE INVENTION

1. Field of the Invention

The invention generally relates to the field of data mining and, more particularly, to a system and a computer-implemented method of detecting relationships by creating input files of text patterns for each type of relationship, identifying a specific text pattern within a text-based document, tagging proper names in the text-based document, and extracting those proper names located within the specific text pattern so as to identify the two entities in the relationship.

2. Description of the Related Art

Recently, there has been a rapid growth of on-line discussion groups and news websites on the World Wide Web (WWW). Detecting relationships between entities (e.g., buyer/seller, employee/employer, partnerships, parent/subsidiaries, etc.) discussed on those websites could prove to be a valuable resource (e.g., to a company investigating a rival company's business dealings, to a company or individual investigating a prospective client, employee, or contractor, etc.). However, the task of manually detecting such relationships from amongst the large corpus of documents contained on the Web is laborious. Thus, there is a need for a system and computer-implemented method for automatically and accurately detecting relationships in unstructured text contained within electronic documents with minimal processing times so as to be scalable to large document sets. The challenge is both in identifying entities in a document and in detecting the particular relationship, if any, between two entities.

SUMMARY OF THE INVENTION

In view of the foregoing, embodiments of the invention provide a system and a computer implemented method of detecting relationships in unstructured text.

An embodiment of a method of detecting relationships in unstructured text comprises first creating text patterns that represent different types of relationships and storing those text patterns in an input file. For example, the input file can store various text patterns representing employer/employee relationships, various patterns representing partnership relationships, etc. The text patterns may be custom-created by a user and input into the input file and/or pre-created and stored in the input file by a system manufacturer. A text pattern may be created by developing at least one regular text expression, comprising a plurality of words that describe the particular type of relationship. Additionally, the text pattern is developed with two or more slots positioned within, before, or after this regular text expression. These slots will be used in subsequent method steps, as described below, in order to identify the proper names of the entities involved in the relationship (e.g., a first slot for the name of the first entity and a second slot for the name of the second entity in the relationship). The text pattern can also be created with slot location identifiers which indicate a position of the first slot and/or a position of the second slot relative to the regular text expression. For example, the text pattern can be created with slot location identifiers that indicate that the first slot should be located before the text expression and/or within a predetermined proximity from the text expression (e.g., within a predetermined number of words from the text expression). Similarly, the text pattern can be created with slot location identifiers to indicate that the second slot should be located after the text expression and/or within a predetermined proximity from the text expression. Additionally, the text pattern can be created with a relationship order identifier (i.e., an identifier that defines an order of the first and second entities in the relationship based on the locations of the proper names within the first and second slots). For example, if the type of relationship detected is a customer/seller relationship in which one entity is a "customer of" another entity, a relationship order identifier can be embedded in the text pattern to indicate that the proper name located in the first slot identifies the customer. Lastly, the text pattern can be created with a keyword for the particular type of relationship, and specifically, for the particular text pattern. This keyword may be used in subsequent method steps, as described below, to screen out documents prior to conducting a pattern matching analysis.

In addition to creating an input file, one or more text-based electronic documents (e.g., an unstructured text document (UTD)) are selected for processing by using an input device. The documents can be selected, for example, from the world wide web (WWW), from a wide area network (WAN), from a local area network, etc. The selection of documents can include a specific document, all documents in a specified category of documents, all documents having a specified date range, all documents matching a Boolean query of terms, etc. The selected unstructured text document(s) may be preprocessed, for example, by a preprocessor, in order to provide "noise free" text to either the proper noun tagger or the keyword identifier, described below.

Processing of a selected text-based document comprises analyzing the document in order to determine the location for each proper name occurring within the document. This can be accomplished using a multi-step process performed, for example, by a proper noun tagger. The tagger can be adapted to first scan the document in order to identify each of the proper names occurring within the document based on a predetermined set of matching rules. The set of matching rules can be based, for example, on word capitalization, sentence structure, sentence boundaries, excluded words, etc. The tagger can also be adapted to re-scan the document in order to tag and record each of the proper names found within the document along with their the locations.

Processing of a selected text-based document also comprises analyzing the document on a sentence by sentence basis so as to locate a text pattern within the document. This can also be accomplished using a multi-step process performed, for example, by a pattern keyword identifier and pattern matcher. The keyword identifier can be adapted to first scans the document in order to determine whether or not a keyword from one or more of the text patterns in the input file are located in the document. If a keyword for a particular text pattern is found, then a full text pattern matching process can be performed, for example, by a pattern matcher, to determine if the regular text expression defined in the particular text pattern is located in the document. If a full text pattern is found within the document, the identity of the document is recorded and the location of the full text pattern is flagged.

Upon detection of a full text pattern with a document, a multi-step relationship detection process is performed, for example, by a relationship detector. The relationship detector refers to the list of proper names recorded by the proper noun tagger and determines if proper names are located within the first and second slots and extracts those proper names, thereby, identifying the first and second entities engaged in the relationship. Additionally, if an order for the relationship between the first and second entities is defined in the text pattern, then the relationship detector determines the order. Lastly, the relationship detector outputs the results of the relationship detection analysis. Specifically, the relationship detector can provide an output comprising the type of relationship, the names of the first and second entities engaged in the relationship, the order of the relationship (if applicable) and the identification of the document and the location in the document where the relationship was detected (i.e., the location of the text pattern), which can be stored and/or displayed.

An embodiment of a system for detecting relationships in one or more unstructured text documents comprises text pattern input files, a keyword identifier, a pattern matcher, a proper noun tagger and a relationship detector.

More specifically, the system can comprise text pattern input files stored in memory. These input files comprise text patterns that describe different types of relationships. The text patterns can be pre-created and input in the input file (e.g., by a system manufacturer) or custom developed and input into the input file by the user using an input device (e.g., a keyboard, disk, CD, internet link, hard drive, etc.). Each text pattern can comprise at least one regular text expression having a plurality of words that describe a particular relationship as well as two or more slots positioned within, before, or after this regular text expression. The slots will be used by system features, as described below, in order to identify the proper names of the entities involved in the relationship (e.g., a first slot for the name of the first entity and a second slot for the name of the second entity in the relationship). The text pattern can also comprise slot location identifiers that indicate a position of the first slot and/or a position of the second slot relative to the regular text expression, as described in detail above. Additionally, the text pattern can comprise a relationship order identifier that defines an order of the first and second entities in the relationship based on the locations of the proper names within the first and second slots, also as described in detail above. Lastly, the text pattern can comprise a keyword for the particular type of relationship and, specifically, for the particular text pattern. This keyword may be used by other features of the system, as described below, to screen out documents prior to conducting a pattern matching analysis.

A communications link can be established between the system and a source for unstructured text documents (e.g., the world wide web (WWW), a wide area network (WAN), a local area network, etc.) so that a user of the system, using an input device (e.g., a keyboard, mouse, etc.) can select one or more text-based electronic documents for analysis. The documents may be selected such that they include a specific document, all documents in a specified category of documents, all documents having a specified date range, all documents matching a Boolean query of terms, etc. The system may further comprise a pre-processor adapted to pre-process selected unstructured text document(s) prior to analysis in order to provide "noise free" text to either the proper noun tagger or the keyword identifier, described below.

The proper noun tagger can be adapted to receive the selected unstructured text document(s) and to perform a multi-step tagging process on the documents. Specifically, the tagger can be adapted to first scan each document in order to identify each occurrence of a proper name within the document based on a predetermined set of matching rules. The set of matching rules can be based, for example, on word capitalization, sentence structure, sentence boundaries, excluded words, etc. The tagger can also be adapted to re-scan the document in order to tag and record a list of each of the proper names found within the document along with their the locations.

The keyword identifier is in communication with the relationship pattern input file and is adapted to receive the selected unstructured text document(s) (e.g., before, after, or separate from the processing by the proper noun tagger) and to analyze the document(s). Specifically, the keyword identifier is adapted to scan each document sentence by sentence in order to determine whether or not a keyword from one or more of the text patterns in the input file is located in the document. If a keyword for a particular text pattern is found, the document is forwarded to a pattern matcher for further analysis.

The pattern matcher is adapted to perform a full text pattern matching process on the forwarded document. Specifically, the pattern matcher is adapted to scan the document sentence by sentence to determine if the regular text expression defined in the particular text pattern associated with the keyword is located in the document. If a full text pattern is found within the document, the identity of the document is recorded, the location of the full text pattern is flagged, and the document is forwarded to the relationship detector.

The relationship detector is in communication with the proper noun tagger and is adapted to analyze the document further in order to detect a relationship. Specifically, the relationship detector is adapted to refer to the list of proper names recorded by the proper noun tagger and determines if proper names are located within the first and second slots for the text pattern that was located in the document. If proper names are found in both slots, the relationship detector extracts those proper names, and thereby, identifies the first and second entities engaged in the relationship described by the text pattern. Additionally, if an order for the relationship between the first and second entities is defined in the text pattern, then the relationship detector determines the order of each named entity. Lastly, the relationship detector outputs the results of the relationship detection analysis. Specifically, the relationship detector can provide an output comprising the type of relationship, the names of the first and second entities engaged in the relationship, the order of the relationship (if applicable) and the identification of the document and the location in the document where the relationship was detected (i.e., the location of the text pattern). This output can be stored (e.g., in a data storage device) and/or displayed on a display screen.

These and other aspects of embodiments of the invention will be better appreciated and understood when considered in conjunction with the following description and the accompanying drawings. It should be understood, however, that the following description, while indicating embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

As mentioned above, there is need for a system and a computer-implemented method for automatically and accurately detecting relationships (e.g., a partner relationship between two corporations, an employee-employer relationship between two people, a seller-customer relationship, etc.) in unstructured text contained within electronic documents with minimal processing times so as to be scalable to large document sets. The challenge is both in identifying entities in a document and in detecting the particular relationship, if any, between two entities. Therefore, disclosed herein are embodiments of a system and method for detecting any type of relationship that is described in unstructured text-based electronic documents. Specifically, the system and method each incorporate the use of an input file that contains one or more text patterns that represent particular relationships. The text patterns each include regular text expressions that describe the particular relationship and slots for the location of each entity in that relationship. Document(s) are selected by a user and scanned by a proper noun tagger that identifies and tags every occurrence of a proper name within the document(s). Then, a pattern matcher scans the document(s) to match text patterns from the input file. If a text pattern is matched a relationship detector extracts the proper names found in the slots for each matched text pattern. The output from the relationship detector includes the names for each entity in a relationship, the type of relationship, and the identity of the document and the location of the sentence describing the relationship in the document.

Figure 1:
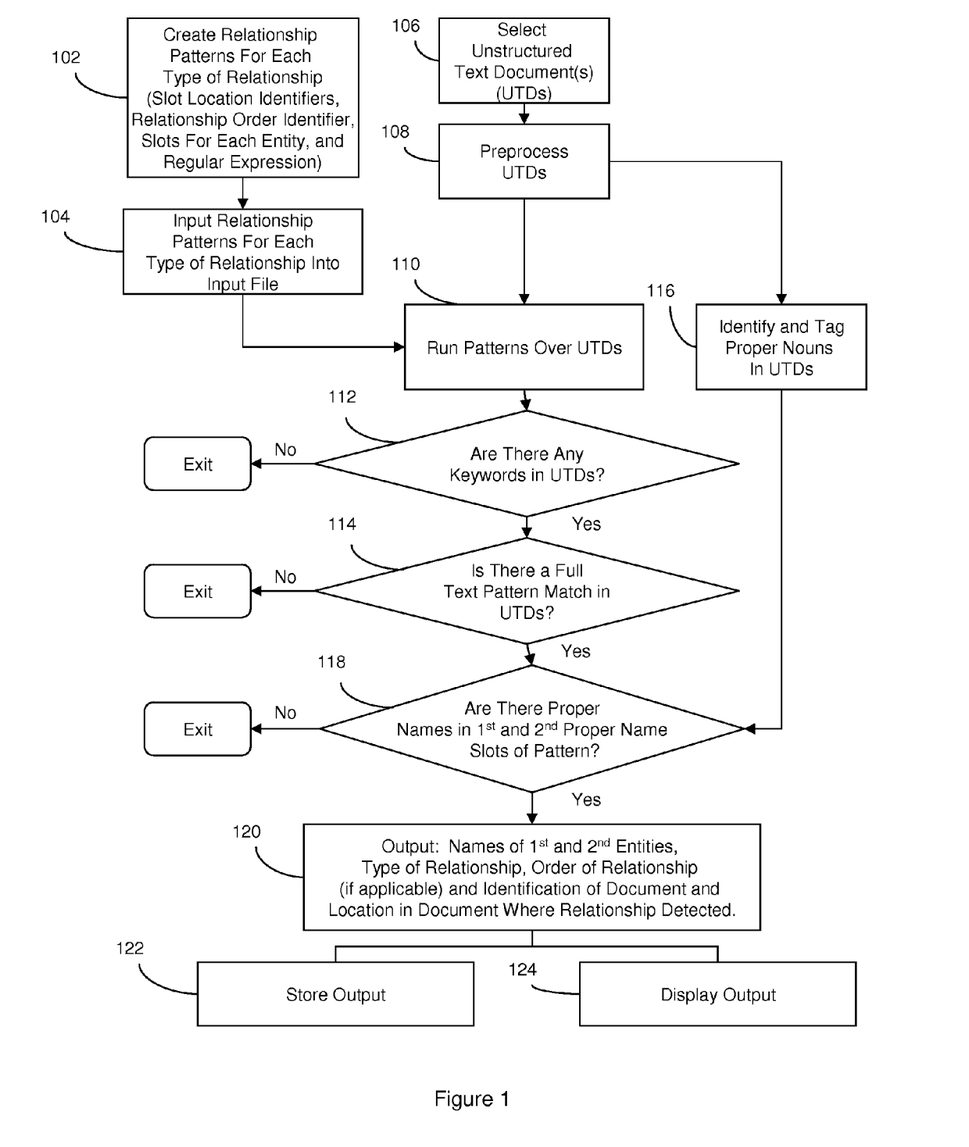
FIG. 1 is a schematic flow diagram of an embodiment of a method of detecting relationships in unstructured text-based electronic documents.
Figure 2:
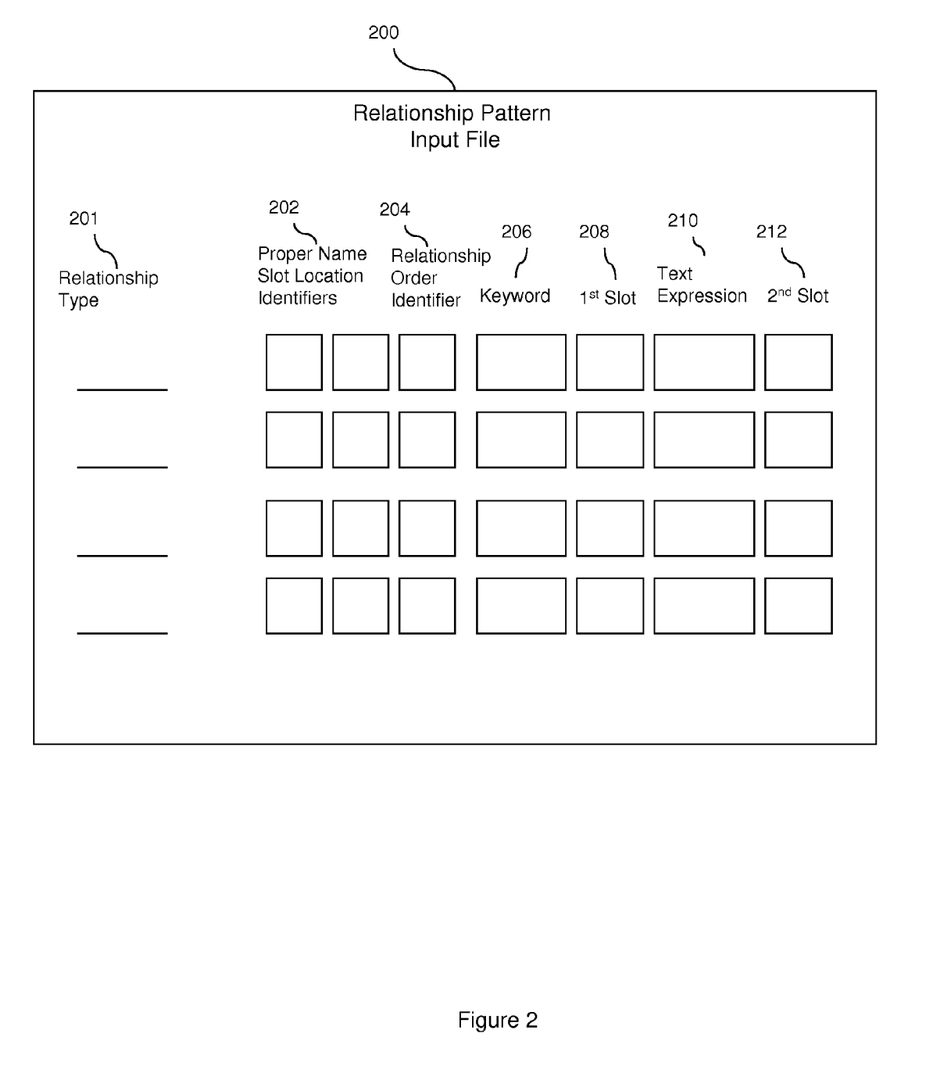
FIG. 2 is a schematic block diagram of an exemplary relationship text pattern input file.
Figure 3:
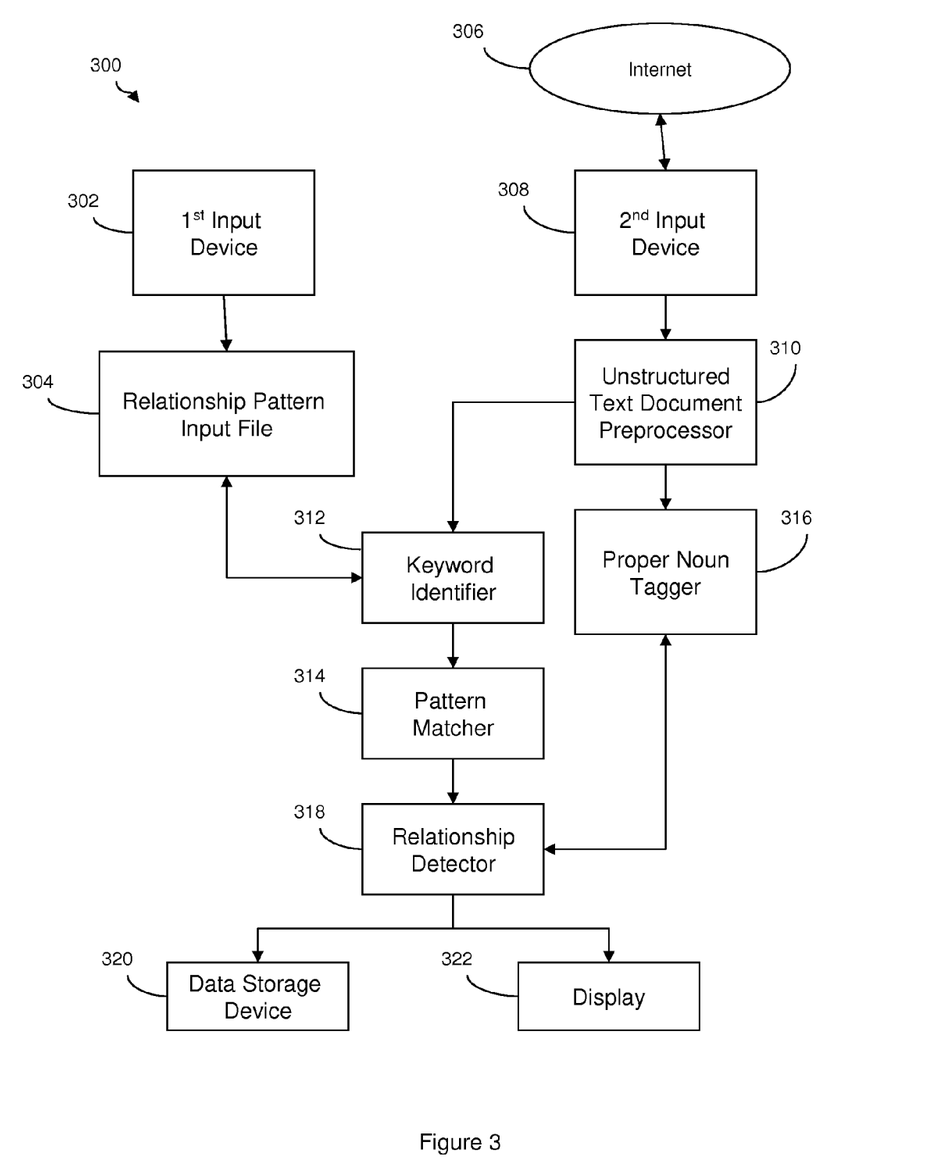
FIG. 3 is a schematic block diagram representing an embodiment of a system of detecting relationships in unstructured text-based electronic documents; and, FIG. 4 is a schematic representation of a computer system suitable for use in detecting relationships in unstructured text-based electronic documents.

More particularly, referring to FIG. 1, an embodiment of a method of detecting relationships in unstructured text comprises first creating text patterns 205 that represent different types of relationships 201 and storing those text patterns 205 in an input file 200, as illustrated in FIG. 2 (102-104). For example, the input file 200 can store various text patterns representing different types of relationships 201, such as employer/employee relationships, various patterns representing partnership relationships, etc. The text patterns 205 may be custom created and input into the input file 200 by a user and/or pre-created and stored in the input file 200 by a system manufacturer (e.g., as illustrated in FIG. 3 and discussed below). Any number of input files may be given as input with each file containing a list of patterns 205 for a particular relationship 201.

Specifically, the text patterns 205 may be created by developing at least one regular text expression 210, comprising a plurality of words that describe the particular type of relationship, and providing two or more slots 208, 212 positioned within, before, or after this regular text expression. These slots will be used in subsequent method steps, as described below, in order to identify the proper names of the entities involved in the relationship (e.g., a first slot for the name of the first entity and a second slot for the name of the second entity in the relationship). The text pattern 205 can also be created with slot location identifiers 202 that indicate a position of the first slot and/or a position of the second slot relative to the regular text expression. For example, the text pattern 205 can be created with a slot identifier 202a to indicate that the first slot 208 should be located before the text expression 210 and/or within a predetermined proximity from the text expression (e.g., within a predetermined number of words from the text expression). Similarly, the text pattern 205 can be created with a slot identifier 202b to indicate that the second slot 212 should be located after the text expression 210 and/or within a predetermined proximity from the text expression. Additionally, the text pattern 205 can be created with a relationship order identifier 204 (i.e., an identifier that defines an order of the first and second entities in the relationship that is not symmetric based on the locations of the proper names within the first and second slots 208 and 212). For example, if the type of relationship detected is a customer/seller relationship in which one entity is a "customer of" another entity, a relationship order identifier can be embedded in the text pattern to indicate that the proper name located in the first slot identifies the customer. Lastly, the text pattern 205 can also be created with a keyword 206 for the particular type of relationship 201, and specifically, for the particular text pattern. This keyword 206 may be used in subsequent method steps, as described below, to screen out documents prior to conducting a pattern matching analysis and to, thereby, improve the speed of the pattern-matching.

For example, the text patterns 205 may be described in any language that supports regular expression matching (e.g., Perl) such that the slots 208 and 212 for the entities match the $1 and $2 variables after a successful match is performed. The following illustrates an exemplary text pattern for a customer relationship between two corporations:

0,1,1,awarded,(,*) (?:has)awarded (.*) a (?:[˜]*){0,
        3}contract

This exemplary text pattern contains four comma-separated fields: (1) a first number (i.e., slot location identifier 202), (2) a second number (i.e., another slot location identifier 202), (3) a third number (i.e., a relationship order identifier 204), (4) a keyword (206) for the pattern, and (5) a regular expression 210 with two slots 208 and 210. Pursuant to Perl syntax, the text matching the first (.*) in the expression will be accessible via the $1 variable after a successful match has been performed. Similarly, the second occurrence will be accessible via the $2 variable. These two variables describe the location of the slot for each entity in the pattern. When a match is performed, these slots may contain an arbitrary amount of text. When the matching is performed, proper names are located within the slots. The first two numbers in this exemplary text pattern comprise the slot location identifiers 202 and refer to the text matched in the $1 and $2 slots, respectively. A 0 means that for a successful match, a proper name found within the slot must occur to the far right, a 1 means it must occur to the far left. The third number in the exemplary text pattern comprises the relationship order identifier which specifies the order of the entities in the relationship. For example, if the relationship is "customer of," a 1 in this field means that entity 1 (matched via $1) is a customer of entity 2 (matched via $2). A 2 in this field would mean that entity 2 is a customer of entity 1. If this field is 0, the relationship is symmetric, as in a partnership relation.

At the start of the process, all input files and corresponding text patterns are loaded into memory and a mapping is created from relationship type 201 to the set of patterns 205 for that relationship.

Referring again to FIG. 1, in addition to creating an input file, one or more text-based electronic documents (e.g., an unstructured text document (UTD)) are selected for processing by using an input device (e.g., the same or a different input device than that used to create and input input files) (106). The documents can be selected, for example, from the world wide web (WWW), from a wide area network (WAN), from a local area network, etc. The selection of documents can include a specific document, all documents in a specified category of documents, all documents having a specified date range, all documents matching a Boolean query of terms, etc. Each selected unstructured text document may be preprocessed (108), for example, by a preprocessor, in order to provide "noise free" text to either the proper noun tagger or the keyword identifier, described below.

Processing of each selected text-based document comprises analyzing the document in order to determine the location for each proper name occurring within the document (116). This can be accomplished using a multi-step process performed, for example, by a proper noun tagger. The tagger can be adapted to first scan the document in order to identify each of the proper names occurring within each document based on a predetermined complex set of matching rules and lexicons. The set of matching rules define the proper nouns based, for example, on word capitalization, sentence structure, sentence boundaries, excluded words, etc. For example, the list of excluded words may include months, days of the week, words not capitalized in a title, etc. An exemplary rule may provide that all capitalized words, not located at the beginning of a sentence and not included on the list of excluded words, are identifiable as proper nouns. The tagger can also be adapted to re-scan the document in order to tag and record a list of each of the proper names found within the document along with their the locations.

Processing of each selected text-based document also comprises analyzing the document on a sentence by sentence basis so as to locate a text pattern within the document (110). This can also be accomplished using a multi-step process performed, for example, by a pattern keyword identifier and pattern matcher. The keyword identifier can be adapted to first scans the document in order to determine whether or not a keyword from one or more of the text patterns in the input file are located in the document (112). If a keyword for a particular text pattern is found, then a full text pattern matching process can be performed, for example, by a pattern matcher, to determine if the regular text expression defined in the particular text pattern is located in the document (114). If a full text pattern is found within the document, the identity of the document is recorded and the location of the full text pattern is flagged.

Upon detection of a full text pattern within a document, a multi-step relationship detection process is performed, for example, by a relationship detector. The relationship detector refers to the list of proper names recorded by the proper noun tagger and determines if proper names are located within the first and second slots and extracts those proper names, thereby, identifying the first and second entities engaged in the relationship (118). Additionally, if an order for the relationship between the first and second entities is defined in the text pattern, then the relationship detector determines the order. Lastly, the relationship detector outputs the results of the relationship detection analysis (120). Specifically, the relationship detector can provide an output comprising the type of relationship, the names of the first and second entities engaged in the relationship, the order of the relationship (if applicable) and the identification of the document and the location in the document where the relationship was detected (i.e., the location of the text pattern), which can be stored (122) and/or displayed (124).

Referring to FIG. 3, an embodiment of a system 300 for detecting relationships in one or more unstructured text documents comprises a text pattern input file 304, a keyword identifier 312, a pattern matcher 314, a proper noun tagger 316 and a relationship detector 318.

More specifically, the system 300 can comprise input files 304 stored in memory 305 (e.g., a hard drive, a disk, data storage device, etc.). The input files 304, as illustrated in FIG. 2 and discussed above, comprise a plurality of text patterns 205 that describe different types of relationships 201. These text patterns 205 can be pre-created and input in the input files 304 (e.g., by a system manufacturer) or custom developed and input into the input files 304 by the user using an input device 302 (e.g., a keyboard, disk, CD, internet link, hard drive, etc.).

Each text pattern 205 can comprise at least one text expression 210, discussed in detail above, having a plurality of words that describe a particular relationship 201 as well as two or more slots 208, 212 positioned within, before, or after this regular text expression 210. The slots 208, 212 will be used by the relationship detector 318, as described below, in order to identify the proper names of the entities involved in the relationship (e.g., a first slot 208 for the name of the first entity and a second slot 212 for the name of the second entity in the relationship). The text pattern 205 can also comprise slot location identifiers 202*a-b* that indicate a position of the first slot 208 and/or a position of the second slot 212 relative to the regular text expression 210, as described in detail above. Additionally, the text pattern 205 can comprise a relationship order identifier 204 that defines an order of the first and second entities in the relationship based on the locations of the proper names within the first and second slots 208, 212, also as described in detail above. Lastly, the text pattern 205 can comprise a keyword 206 for the particular type of relationship 201 and, specifically, for the particular text pattern 205. This keyword 206 may be used by the keyword identifier 312, as described below, to screen out documents prior to conducting a pattern matching analysis in order to improve processing speed.

A communications link 307 can be established between the system 300 and a source 306 for unstructured text documents (e.g., the Internet, the world wide web (WWW), a wide area network (WAN), a local area network, etc.) so that a user of the system 300 can select, using an input device 308 (e.g., a keyboard, a mouse, etc.) one or more text-based electronic documents 309 for analysis. The document(s) may be selected to include specific document(s), all documents in a specified category of documents, all documents having a specified date range, all documents matching a Boolean query of terms, etc. The system 300 may further comprise a preprocessor 310 adapted to pre-process each selected unstructured text document 309 prior to analysis in order to provide "noise free" text to either the proper noun tagger 315 or the keyword identifier 312, described below.

The proper noun tagger 315 can be adapted to receive each selected unstructured text document 309 and to perform a multi-step tagging process on the documents. Specifically, the tagger 315 can be adapted to first scan each document in order to identify each occurrence of a proper name within the document based on a predetermined and complex set of matching rules and lexicons. The set of matching rules can be based, for example, on at least one of word capitalization, sentence structure, sentence boundaries, and excluded words (e.g., as illustrated in the detail discussion above). The tagger 315 can also be adapted to re-scan the document(s) 309 in order to tag each proper name and record a list of each of the proper names found within the document along with their the locations 317 in memory 318.

The keyword identifier 312 is in communication with (i.e., is adapted to access) the relationship pattern input file 304 and is further adapted to receive the selected unstructured text document(s) 309 from the preprocessor 310 (e.g., before, after, or separate from the processing by the proper noun tagger) and to analyze each document 309. Specifically, the keyword identifier 312 is adapted to scan each document 309 sentence by sentence in order to determine whether or not a keyword 206 from one or more of the text patterns 205 in the input file (as illustrated in FIG. 2) are located in the document 309. If a keyword 206 for a particular text pattern 205 is found, the document containing the keyword is forwarded to a pattern matcher 314 for further analysis.

The pattern matcher 314 is adapted to perform a full text pattern matching process on the forwarded document. Specifically, the pattern matcher 314 is adapted to scan the document sentence by sentence to determine if the regular text expression defined in the particular text pattern associated with the keyword is located in the document. If a full text pattern is found within the document, the identity of the document and the location of the full text pattern 320 is recorded in a memory 319 that is accessible by the relationship detector 318. The document that contains the full text pattern is then forwarded to the relationship detector 318 for further analysis.

The relationship detector 318 is adapted to further analyze the document that contains the full text pattern in order to detect a relationship and, particularly, the entities engaged in the relationship. Specifically, the relationship detector 318 is adapted to access the memory 316 in order to refer to the list of proper names 317 recorded by the proper noun tagger 315. The relationship detector 318 then reviews the document and determines if proper names are located within the first and second slots for the text pattern that was located within the document. If proper names are found in both slots, the relationship detector 318 extracts those proper names, and thereby, identifies the first and second entities engaged in the relationship described by the text pattern. Additionally, if an order for the relationship between the first and second entities is defined in the text pattern, then the relationship detector 318 determines the order of each named entity. Lastly, the relationship detector outputs the results of the relationship detection analysis. Specifically, the relationship detector 318 can provide an output comprising the type of relationship (as defined by the text pattern), the names of the first and second entities engaged in the relationship, the order of the relationship (if applicable) and the identification of the document and the location in the document where the relationship was detected (i.e., the location of the text pattern). This output can be stored (e.g., in a data storage device 322) and/or displayed on a display screen 324.

Embodiments of the system 300, described above, can take the form of an entirely hardware embodiment, an entirely software embodiment or an embodiment including both hardware and software elements. In a preferred embodiment, the invention is implemented using software, which includes but is not limited to firmware, resident software, microcode, etc. Furthermore, embodiments of the system 300 can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Figure 4:
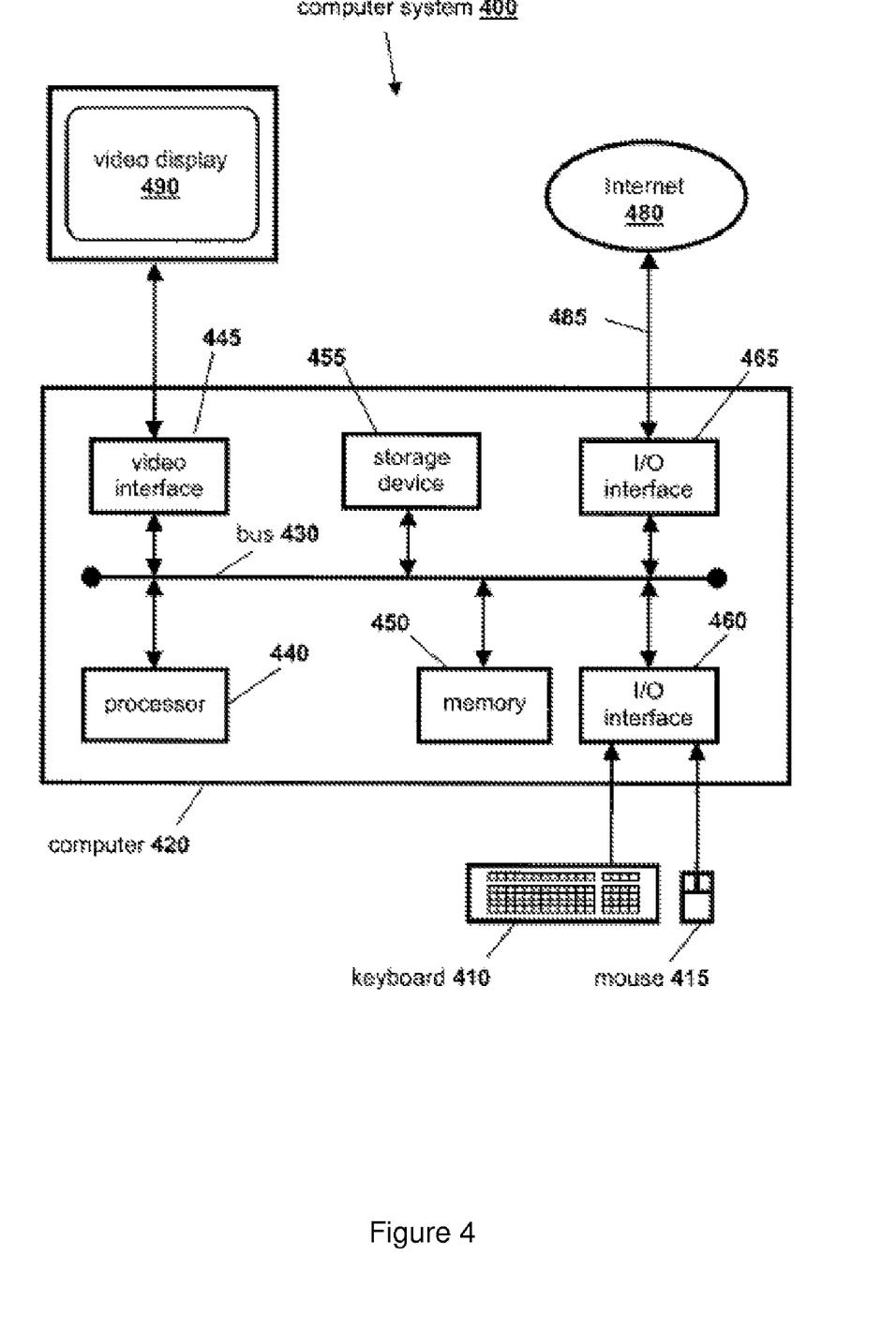

FIG. 4 is a schematic representation of an exemplary computer system 400 suitable for use in detecting relationships as described herein. Computer software executes under a suitable operating system installed on the computer system 400 to assist in performing the described techniques. This computer software is programmed using any suitable computer programming language, and may be though of as comprising various software code means for achieving particular steps. The components of the computer system 400 include a computer 420, a keyboard 410 and a mouse 415, and a video display 490. The computer 420 includes a processor 440, a memory 450, input/output (I/O) interfaces 460, 465, a video interface 445, and a storage device 455. The processor 440 is a central processing unit (CPU) that executes the operating system and the computer software executing under the operating system. The memory 450 includes random access memory (RAM) and read-only memory (ROM), and is used under direction of the processor 440. The video interface 445 is connected to video display 490. User input to operate the computer 420 is provided from the keyboard 410 and mouse 415. The storage device 455 can include a disk drive or any other suitable storage medium. Each of the components of the computer 420 is connected to an internal bus 430 that includes data, address, and control buses, to allow components of the computer 420 to communicate with each other via the bus 430. The computer system 400 can be connected to one or more other similar computers via input/output (I/O) interface 465 using a communication channel 465 to a network, represented as the Internet 480. The computer software may be recorded on a portable storage medium, in which case, the computer software program is accessed by the computer system 400 from the storage device 455. Alternatively, the computer software can be accessed directly from the Internet 480 by the computer 420. In either case, a user can interact with the computer system 400 using the keyboard 410 and mouse 415 to operate the programmed computer software executing on the computer 420. Other configurations or types of computer systems can be equally well used to implement the described techniques. The computer system 400 described above is described only as an example of a particular type of system suitable for implementing the described techniques.

Therefore, disclosed above are embodiments of a system and a method for detecting relationships described in unstructured text-based electronic documents. The system and method incorporate the use of an input file that contains one or more text patterns that represent particular relationships. The text patterns each include regular text expressions that describe the particular relationship and slots for the location of each entity in that relationship. Document(s) are selected by a user and scanned by a proper noun tagger that identifies and tags every occurrence of proper names within the document(s). Then, a pattern matcher scans the document(s) to match text patterns. If a text pattern is matched within a document a relationship detector extracts all pairs of proper names found in the slots for each matched text pattern. The output from the relationship detector includes the names for each entity in the relationship, the type of relationship, and the identity of the document and the location of the sentence describing the relationship in the document. This method and associated system are extremely cost and time efficient because they avoid the need of natural language processing or parsing (i.e., running expensive machines such as parsers and parts-of-speech taggers is unnecessary), so that they are scalable to a large number of documents. Additionally, because a user may define the text patterns with regular text expressions (as opposed to a single word or simple phrase) describing each relationship, the system and method are applicable to any type of relationship and are very precise in detecting particular relationships.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A computer-implemented method of detecting that different entities identified by different proper names are in a relationship, said method comprising:
    storing, in a storage device, an input file comprising text patterns, each text pattern comprising:
        a specific text expression that represents a specific type of relationship between a first entity and a second entity;
        a first slot location identifier indicating a location of a first slot for a first proper name of said first entity in said specific type of relationship relative to said specific text expression; and
        a second slot location identifier indicating a location of a second slot for a second proper name of said second entity in said specific type of relationship relative to said specific text expression;
    locating and tagging, by a processor, occurrences of all proper names within multiple text-based documents in order to generate a list of proper names and locations of said proper names within said multiple text-based documents;
    analyzing, by said processor, said multiple text-based documents so as to locate a document that contains said specific text expression of a specific text pattern; and
    accessing, by said processor, said list to determine if any of said proper names on said list are located in said document within said first slot relative to said specific text expression, as determined based on said first slot location identifier, and within said second slot relative to said specific text expression, as determined based on said second slot location identifier so as to detect said specific type of relationship and so as to identify, said first entity in said specific type of relationship by said first proper name and said second entity in said specific type of relationship by said second proper name, respectively.

2. The method of claim 1, said specific text expression comprising a plurality of words that describe said specific type of relationship with one of said words being a keyword and said method further comprising, before said analyzing of said multiple text-based documents, scanning said multiple text-based documents to determine if said keyword is located in said document and only performing said analyzing if said keyword is located in said document.

3. The method of claim 1, said specific text expression comprising a plurality of words that describe said specific type of said relationship, said first slot location identifier indicating whether said first slot for said first entity is located before, within, or after said plurality of words, and said second slot location identifier indicating whether said second slot for said second entity is located before, within, or after said plurality of words.

4. The method of claim 1, said locating and said tagging of said comprising:
    scanning said multiple text-based documents to identify any proper names occurring within any of said multiple text-based documents based on a set of matching rules;
    re-scanning said multiple text-based documents to tag locations for each of said proper names identified; and
    recording said locations in said list.

5. The method of claim 4, said set of matching rules being based on at least one of word capitalization, sentence structure, sentence boundaries, and excluded words.

6. The method of claim 1, each of said text patterns further comprising a relationship order identifier indicating relative positions of said two different entities in said specific type of relationship as a function of said locations of said proper names within said first slot and said second slot.

7. The method of claim 6, further comprising storing a record comprising said first proper name of said first entity, said second proper name of said second entity, said specific type of relationship between said first entity and said second entity, a first position of said first entity and a second position of said second entity in said specific type of relationship, and an identifier for said document and a location in said document where said specific type of relationship is detected.

8. A system for detecting that different entities identified by different proper names are in a relationship, said system comprising:
    a storage device storing an input file comprising text patterns, each text pattern comprising:
        a specific text expression that represents a specific type of relationship between a first entity and a second entity;

a first slot location identifier indicating a location of a first slot for a first proper name of said first entity in said specific type of relationship relative to said specific text expression; and a second slot location identifier indicating a location of a second slot for a second proper name of said second entity in said specific type of relationship relative to said specific text expression; and a processor comprising:

a proper noun tagger locating and tagging occurrences of all proper names within multiple text-based documents in order to generate a list of proper names and locations of said proper names within said multiple text-based documents;

a pattern matcher accessing said input file in said storage device and analyzing said multiple text-based documents so as to locate a document that contains said specific text expression of a specific text pattern within said document; and a relationship detector in communication with said pattern matcher and said proper noun tagger, said relationship detector accessing said list to determine if any of said proper names on said list are located in said document within said first slot relative to said specific text expression, as determined based on said first slot location identifier, and within said second slot relative to said specific text expression, as determined based on said second slot location identifier, so as to detect said specific type of relationship and so as to identify, by name, said first entity in said specific type of relationship by said first proper name and said second entity in said specific type of relationship by said second proper name, respectively.

9. The system of claim 8, said specific text expression comprising a plurality of words that describe said specific type of relationship with one of said words being a keyword and said system further comprising a keyword identifier accessing said input file in said storage device, scanning said multiple text-based documents for said keyword to determine if said keyword is located in said document, and forwarding said document to said pattern matcher only if said keyword is located in said document.

10. The system of claim 8, said specific text expression comprising a plurality of words that describe said specific type of relationship, said first slot location identifier indicating whether said first slot for said first entity is located before, within, or after said plurality of words, and said second slot location identifier indicating whether said second slot for said second entity is located before, within, or after said plurality of words.

11. The system of claim 8, each of said text patterns further comprising a relationship order identifier indicating relative positions of said two different entities in said specific type of relationship as a function of said locations of said proper names within said first slot and said second slot.

12. The system of claim 8, said proper noun tagger locating and tagging by performing the following:

scanning said multiple text-based documents to identify any proper names occurring within said multiple text-based documents based on a set of matching rules;

re-scanning said multiple text-based documents to tag locations for each of said proper names identified; and recording said locations in said list.

13. The system of claim 12, said set of matching rules being based on at least one of word capitalization, sentence structure, sentence boundaries, and excluded words.

14. The system of claim 11, said storage device further storing a record comprising said first proper name of said first entity, said second proper name of said second entity, said specific type of relationship between said first entity and said second entity, a first position of said first entity and a second position of said second entity in said specific type of relationship, and an identifier for said document and a location in said document where said specific type of relationship is detected.

15. A program storage medium readable by a computer and tangibly embodying a program of instructions executable by said computer to perform a method of detecting a that different entities identified by different proper names are in a relationship, said method comprising:

storing an input file comprising text patterns, each text pattern comprising:

a specific text expression that represents a specific type of relationship between a first entity and a second entity;

a first slot location identifier indicating a location of a first slot for a first proper name of said first entity in said specific type of relationship relative to said specific text expression; and a second slot location identifier indicating a location of a second slot for a second proper name of said second entity in said specific type of relationship relative to said specific text expression;

locating and tagging occurrences of all proper names within multiple text-based documents in order to generate a list of proper names and locations of said proper names within said multiple text-based documents;

analyzing said multiple text-based documents so as to locate a document that contains said specific text expression of a specific text pattern; and accessing said list to determine if any of said proper names on said list are located in said document within said first slot relative to said specific text expression, as determined based on said first slot location identifier, and within said second slot relative to said specific text expression, as determined based on said second slot location identifier so as to detect said specific type of relation ship and so as to identify said first entity in said specific type of relationship by said first proper name and said second entity in said specific type of relationship by said second proper name, respectively.

16. The program storage medium of claim 15, said specific text expression comprising a plurality of words that describe said specific type of relationship with one of said words being a keyword and said method further comprising before said analyzing of said multiple text-based documents, scanning said multiple text-based documents to determine if said keyword is located in said document and only performing said analyzing if said keyword is located in said document.

17. The program storage medium of claim 15, said specific text expression comprising a plurality of words that describe said specific type of said relationship, said first slot location indicating whether said first slot for said first entity is located before, within, or after said plurality of words, and said second slot location indicating whether said second slot for said second entity is located before, within, or after said plurality of words.

18. The program storage medium of claim 15, said locating and said tagging comprising:

scanning said multiple text-based documents to identify any proper names occurring within said multiple text-based documents based on a set of matching rules;

re-scanning said multiple text-based documents to tag locations for each of said proper names identifier; and recording said locations in said list.

19. The program storage medium of claim 18, said set of matching rules being based on at least one of word capitalization, sentence structure, sentence boundaries, and excluded words.

20. The program storage medium of claim 15, each of said text patterns further comprising a relationship order identifier indicating relative positions of said two different entities in said specific type of relationship as a function of said locations of said proper names within said first slot and said second slot.

21. A computer-implemented method of detecting that different entities identified by different proper names are in a relationship, said method comprising:

storing, in a storage device, an input file comprising text patterns, each text pattern comprising:
  a specific text expression that represents a specific type of relationship between a first entity and a second entity;
  a first slot location identifier indicating a location of a first slot for a first proper name of said first entity in said specific type of relationship relative to said specific text expression; and
  a second slot location identifier indicating a location of a second slot for a second proper name of said second entity in said specific type of relationship relative to said specific text expression;

locating and tagging, by a processor, occurrences of all proper names within multiple text-based documents in order to generate a list of proper names and locations of said proper names within said multiple text-based documents;

analyzing, by said processor, said multiple text-based documents so as to locate a document that contains said specific text expression of a specific text pattern; and accessing, by said processor, said list to determine if any of said proper names on said list are located in said document within said first slot relative to said specific text expression, as determined based on said first slot location identifier, and within said second slot relative to said specific text expression, as determined based on said second slot location identifier so as to detect said specific type of relationship and so as to identify said first entity in said specific type of relationship by first proper name and said second entity in said specific type of relationship by said second proper name, respectively, said specific text expression comprising a plurality of words that describe said specific type of relationship with one of said words being a keyword and said method further comprising before said analyzing of said multiple text-based documents, scanning said multiple text-based documents to determine if said keyword is located in said document and only performing said analyzing if said keyword is located in said document, said specific text expression comprising a plurality of words that describe said specific type of relationship, said first slot location identifier indicating whether said first slot for said first entity is located before, within, or after said plurality of words, and said second slot location identifier indicating whether said second slot for said second entity is located before, within, or after said plurality of words, said locating and said tagging comprising:
  scanning said multiple text-based documents to identify any proper names occurring within said multiple text-based documents based on a set of matching rules;
  re-scanning said document to tag locations for each of said proper names identified; and
  recording said locations in said list, said set of matching rules being based on at least one of word capitalization, sentence structure, sentence boundaries, and excluded words, each of said test patterns further comprising a relationship order identifier indicating relative positions of said two different entities in said specific type of relationship as a function of said locations of said proper names within said first slot and said second slot, and said method further comprising storing a record comprising said first proper name of said first entity, said second proper name of said second entity, said specific type of relationship between said first entity and said second entity, a first position of said first entity and a second position of said second entity in said specific type of relationship, and an identifier for said document and a location in said document where said specific type of relationship is detected.

* * * * *